US010731735B1

(12) United States Patent
Wagner (10) Patent No.: US 10,731,735 B1
(45) Date of Patent: Aug. 4, 2020

(54) POWER TRANSFER SYSTEM AND METHOD USING A VARIABLE SPEED RATIO REGULATING DEVICE

(71) Applicant: Mainstream Engineering Corporation, Rockledge, FL (US)

(72) Inventor: Jerald G. Wagner, Myakka City, FL (US)

(73) Assignee: Mainstream Engineering Corporation, Rockledge, FL (US)

( * ) Notice: Subject to any disclaimer, the term of this patent is extended or adjusted under 35 U.S.C. 154(b) by 108 days.

(21) Appl. No.: 15/924,776

(22) Filed: Mar. 19, 2018

(51) Int. Cl.
| | | |
|---|---|---|
| F16H 3/72 | (2006.01) | |
| F04C 2/10 | (2006.01) | |
| F04C 14/06 | (2006.01) | |
| F04C 14/26 | (2006.01) | |
| F16H 48/06 | (2006.01) | |
| F04C 13/00 | (2006.01) | |
| F16H 48/27 | (2012.01) | |
| F16H 48/40 | (2012.01) | |
| F16D 43/284 | (2006.01) | |

(52) U.S. Cl.
CPC ............ *F16H 3/722* (2013.01); *F04C 2/105* (2013.01); *F04C 14/06* (2013.01); *F04C 14/265* (2013.01); *F16H 48/06* (2013.01); *F04C 13/001* (2013.01); *F16D 43/284* (2013.01); *F16H 48/27* (2013.01); *F16H 48/40* (2013.01)

(58) Field of Classification Search
CPC ........... F16H 3/722; F04C 2/102; F04C 2/103
See application file for complete search history.

(56) References Cited

U.S. PATENT DOCUMENTS

| 3,966,367 A * | 6/1976 | Erickson ................ F04C 2/101 418/58 |
| 4,322,988 A * | 4/1982 | Hill ........................ F16H 3/722 192/61 |
| 6,195,990 B1 * | 3/2001 | Machesney ............. F04C 2/103 123/41.12 |
| 6,688,851 B2 | 2/2004 | Phaelan et al. |
| 7,637,832 B1 * | 12/2009 | Laskowski .............. F16H 3/722 475/31 |
| 7,686,724 B2 * | 3/2010 | Capito .................... F16D 31/04 475/93 |
| 2005/0054469 A1 * | 3/2005 | Dyck ...................... B62D 11/18 475/85 |

(Continued)

FOREIGN PATENT DOCUMENTS

| EP | 0216540 A1 * | 4/1987 | ............. F16D 31/04 |
| JP | 2002250411 A * | 9/2002 | ............. F16D 31/02 |

*Primary Examiner* — Tisha D Lewis
(74) *Attorney, Agent, or Firm* — Michael W. O'Neill, Esq.

(57) ABSTRACT

A device is described for transmitting mechanical power that allows variable output-speed to input-speed ratios. Gear sets such as epicyclic gear sets have components that rotate about a common axis selectively at the same rotational speed and at different relative rotational speeds as determined by at least one of fluid flow and fluid pressure. One or more inlet ports and fluid passageways introduce a working fluid into one or more volume spaces between the components. The internal pressure and flow of the working fluid through the device is controlled to provide substantially infinite variability of the output-speed to input-speed ratios for applications where, for example, an engine provides the mechanical power for propelling a vehicle.

13 Claims, 13 Drawing Sheets

(56) References Cited

U.S. PATENT DOCUMENTS

| | | | |
|---|---|---|---|
| 2011/0130236 A1* | 6/2011 | El-Zein | B60T 10/04 475/107 |
| 2012/0208667 A1* | 8/2012 | Lin | F04C 14/24 475/31 |

* cited by examiner

| Engine Performance Data | | | |
|---|---|---|---|
| Engine Speed (rpm) | Engine Power (kW) | BSFC (g/kW-hr) | Fuel Rate (L/hr) |
| 2200 | 168 | 234.8 | 47.0 |
| 2100 | 168 | 233.5 | 46.8 |
| 2000 | 168 | 230.3 | 46.1 |
| 1900 | 168 | 226.1 | 45.3 |
| 1800 | 168 | 222.1 | 44.5 |
| 1700 | 166 | 220.1 | 43.6 |
| 1600 | 163 | 220.2 | 42.7 |
| 1500 | 157 | 220.8 | 41.4 |
| 1400 | 151 | 221.7 | 39.8 |
| 1300 | 135 | 222.9 | 36.6 |
| 1200 | 114 | 224.0 | 30.5 |
| 1000 | 74 | 223.2 | 19.7 |
| 500 | 30 | 224.0 | 9.0 |

Fig. 13

| Requirements | | Torque Converter Performance | | | Regulating Device Performance | | |
|---|---|---|---|---|---|---|---|
| Output Power (kW) | Output Speed (rpm) | Input Power (kW) | Input speed (rpm) | Engine Fuel Consumption (L/hr) | Input Power (kW) | Input speed (rpm) | Engine Fuel Consumption (L/hr) |
| 35.0 | 185 | 176.7 | 1,851 | 47.14 | 38.4 | 723 | 12.2 |
| 67.7 | 370 | 176.8 | 1,854 | 47.18 | 70.5 | 1038 | 20.3 |
| 96.9 | 561 | 177.5 | 1,876 | 47.47 | 98.9 | 1155 | 27.8 |
| 120.6 | 760 | 178.3 | 1,903 | 48.07 | 122.0 | 1216 | 33.7 |
| 153.3 | 1,203 | 181.0 | 2,006 | 49.75 | 154.0 | 1495 | 41.2 |
| 164.0 | 1,723 | 181.4 | 2,155 | 50.72 | 164.0 | 1731 | 43.2 |

POWER TRANSFER SYSTEM AND METHOD USING A VARIABLE SPEED RATIO REGULATING DEVICE

GOVERNMENT LICENSE RIGHTS

The U.S. Government has certain rights in this invention as provided by the terms of Contract Number: W56HZV-17-C-0172, Contract Title: Variable Speed Ratio Gear Drive System, awarded by the U.S. Army Tank Automotive Research Development and Engineering Center.

BACKGROUND AND SUMMARY OF THE INVENTION

The present invention relates to systems, such as a powertrain or a continuously variable transmission, that provide greatly improved speed control, torque transfer, fluid control, and lubrication by using an epicyclic gear set, a hypocycloid gear set and the like as a fluid pump and achieving infinitely variable control of the output shaft to input shaft rotational speeds (speed ratio) of the gear set by controlling fluid flow through, or pressure within, the fluid pump.

The use of a gear set like an epicyclic gear set to change output to input torque and speed ratios is common in many powertrains whose output and input shafts are on the same centerline because of compactness and a high torque capacity. Torque is transferred through the mechanical engagement of gear teeth. If a speed ratio change is desired, the gear set is engaged or disengaged, thereby generating a step change. Multiple gear sets have to be stacked to generate many small step changes between the minimum and maximum desired speed ratios at the expense of compactness.

I have recognized that an infinite speed ratio control between fully engaged and fully disengaged modes of gear sets like epicyclic and hypocycloid gear sets can be achieved by using the gear set as a fluid pump so that the speed ratio is controlled only by the internal pressure.

The present invention employs the novel principle that, if the relative rotational speed between any two of the three main rotating components (ring gear, planet carrier, and sun gear) of an epicyclic gear set is controlled, the overall speed ratio of the gear set can be controlled. The use of a fluid pump run by the gear set's rotating components is thus a simple and novel way to infinitely control the output shaft speed to input shaft speed ratio.

If, on one hand, the fluid is incompressible in a fluid pump and the pump's fluid flow outlet is closed, the pump is hydraulically locked. The pump drive gears then are prevented from having relative motion, and the entire gear set rotates as one unit, generating a 1:1 speed ratio. On the other hand, if the pump outlet is completely opened so that there is no fluid pressure, all gear set components are uncoupled so that no torque is transferred between the input and output, generating a speed ratio of 0. Fluid pressures between fully open and fully closed then control the gear set speed ratio. This has been shown using bulky external fluid pumps as disclosed, for example, in U.S. Pat. No. 6,688,851.

More advantageously, the present invention uses the mechanical power transfer gear set as the fluid pump to regulate its own speed ratio, thereby creating a very compact and self-contained infinitely variable power transfer device requiring very few components. The present invention provides the ability to engage a single gear set with infinite variability between its minimum speed ratio (no fluid pressure) and maximum speed ratio (hydraulically locked).

BRIEF DESCRIPTION OF THE DRAWINGS

Other objects, advantages and novel features of the present invention will become apparent from the following detailed description when considered in conjunction with the accompanying drawings herein.

FIG. 12 is a table showing the output speed, power, and fuel consumption rate information for a common diesel engine.

FIG. 13 is a table showing the required output power and speed of one vehicle's powertrain system. The required input power and speed from the engine required at the input shaft of a torque converter system, and a system using this invention, are tabulated. Fuel consumption rates from FIG. 12 are applied for both systems.

DETAILED DESCRIPTION OF THE DRAWINGS

Figures 1A, 1B:
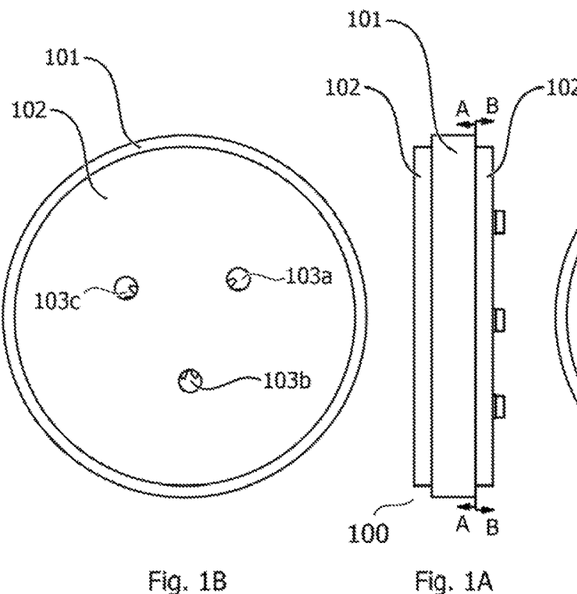
FIG. 1A-1C are, respectively, side, front end plate and rear end plate elevational views of an epicyclic gear set for implementing the present invention.
Figure 1C:
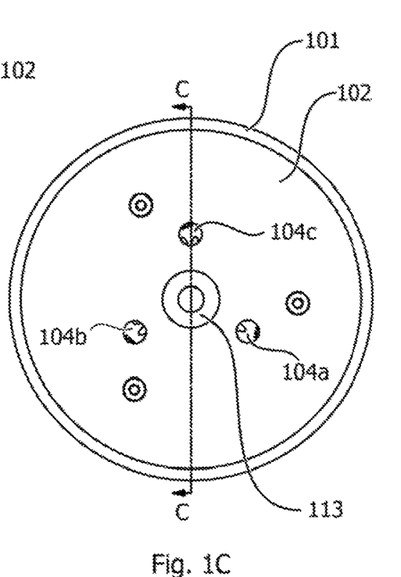

Referring now to FIG. 1A-1C showing side and opposed end views of an epicyclic gear set embodiment designated generally by numeral 100, a ring gear 101 and planetary carrier 102 have a seal for sealing fluid between the components which operate at different speeds rotating about the same centerline. Fluid enters the epicyclic gear set 100 through ports 103a, 103b, 103c shown in FIGS. 1A and 2 and exits through ports 104s, 104b, 104c shown in FIGS. 1C and 3.

Figure 2:
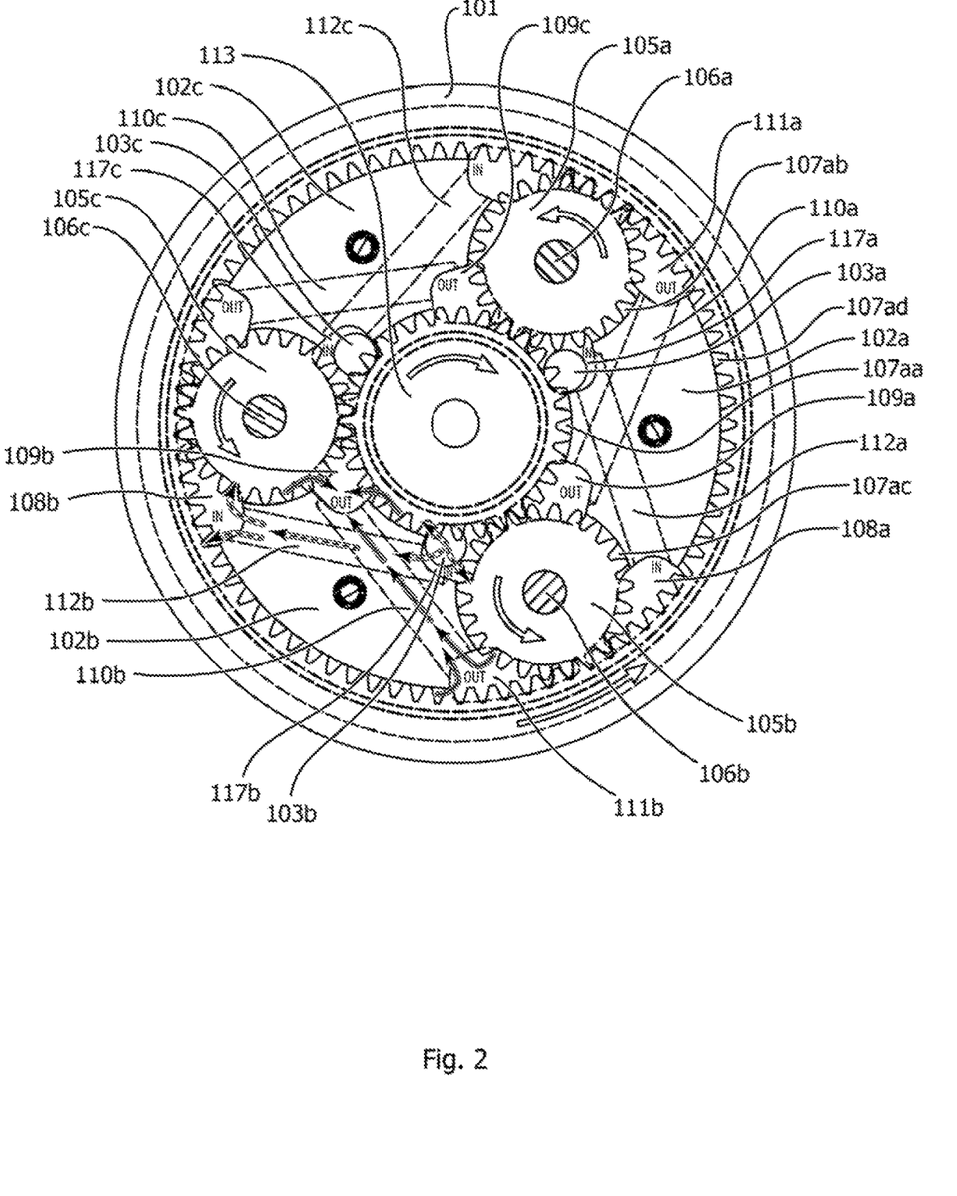
FIG. 2 is a cross-sectional view taken along line A-A of FIG. 1A.

Referring now to FIG. 2, a positive displacement pump is shown inside the ring gear 101. Assume for example that ring gear 101 is the input and a sun gear 113 is the output. The ring gear 101 engages with planet gears 105a, 105b and 105e which, in turn, engage with the sun gear 113. Pinion axles 106a, 106b and 106c are attached to the common planet carrier 102 which rotates about the same centerline as the ring gear 101 and the sun gear 113. If the ring gear 101 is rotated counterclockwise, the planet gears 105a-105c and the planetary carrier 102 rotate counterclockwise.

For implementing the present invention, pump bodies 102a, 102b, 102c are located on the planetary carrier 102 between, respectively, the planet gears 105a and 105b, 105b and 105c, and 105e and 105a, as well as between the ring gear 101, the sun gear 113, and the end plates of the planetary carrier 102 to concurrently capture fluid in four gear teeth cavities per pump body 102*, 102b, 102c which creates one positive displacement fluid pump section. For pump body 102a, for example, the fluid enters through the port 103a to be captured in gear teeth cavities at locations 107aa, 107ab, 107ac, and 107ad to create a pump section. One pump section can exist between every adjacent set of planet gears 105a-105c. For example, pump body 102a creates a pump section residing between the planet gears 105, 105b.

The pump section created by the pump body 102a, the sun gear 113, the ring gear 101, and the planet gears 105a, 105b draws fluid in through port 103a, filling a plenum 117a and directly supplying the fluid to the gear teeth cavities 107a, 107ab. The fluid is supplied to the cavities 107ac and 107ad from plenum 117a through the low-pressure transfer passage 112a and a plenum 108a. Due to the relative motion of the rotating gears, the supplied fluid becomes captured in the cavities 107aa, 107ab, 107ac, 107ad and is transported by gear rotation. The cavities 107ab, 107ad discharge the fluid to a plenum 111a, then through the high-pressure transfer passage 110a to a plenum 109a where discharge fluid from the cavities 107aa, 107ac merge. The pump section's fluid exits the plenum 109a through the port 104a shown in FIG. 3.

Figure 3:
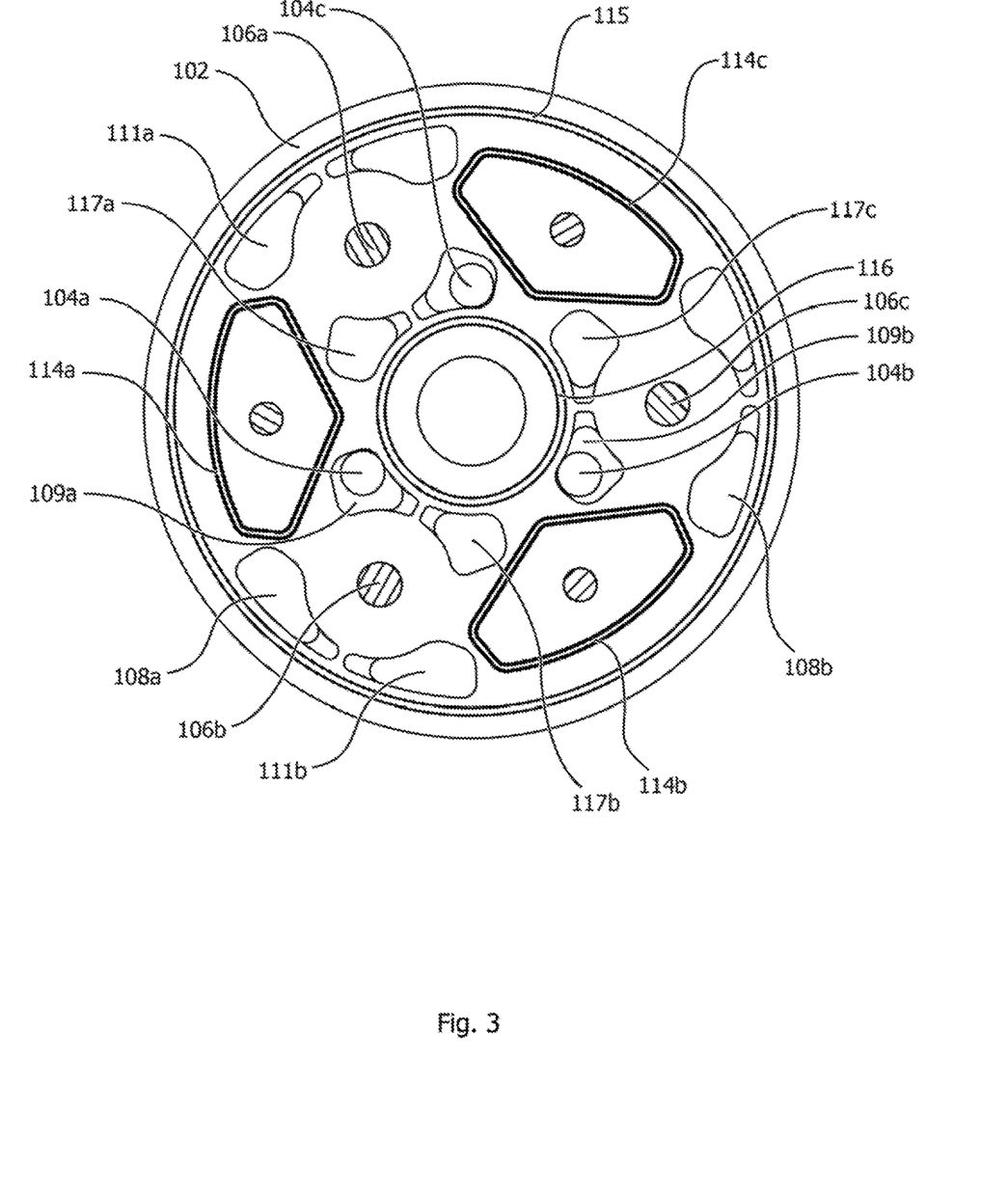
FIG. 3 is a cross-sectional view taken along line B-B of FIG. 1A.

Additional features for minimizing fluid leakage are also shown in FIG. 3. More specifically, a stationary seal 114a-114c is provided for each pump section and rotates with the planetary carrier 102 to reduce leakage within the pump 100. A sealing device 115 of conventional material and construction provides a seal between the planetary carrier 102 and the ring gear 101, and a conventional sealing device 116 provides a seal between the planetary carrier 102 and the sun gear 113.

Figure 4:
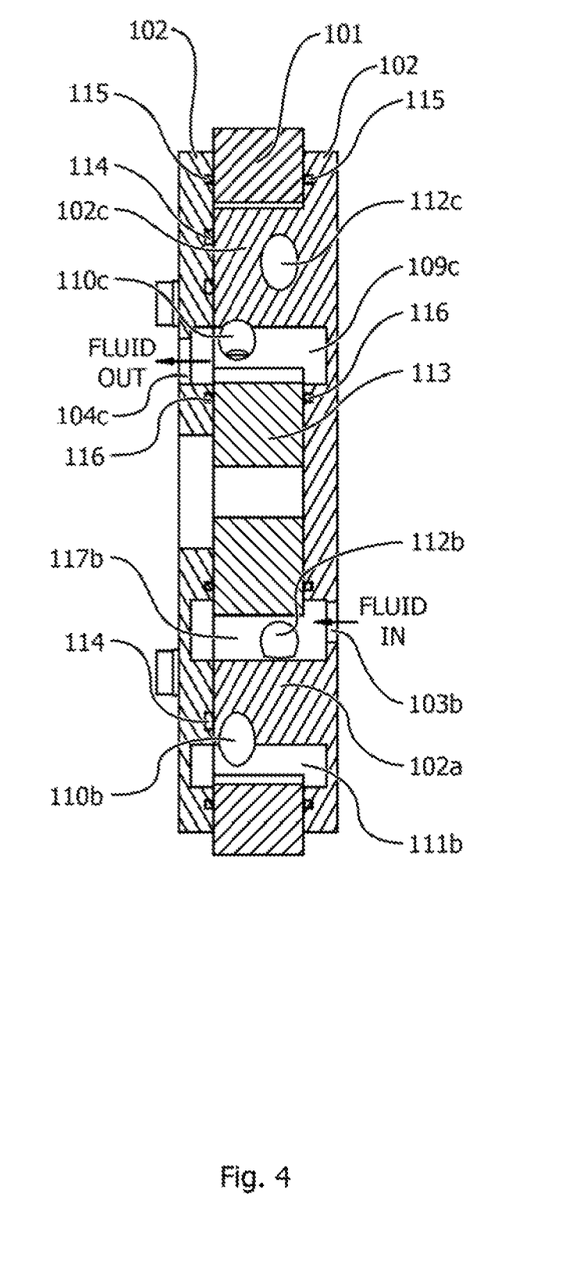
FIG. 4 is a cross-sectional view taken along line C-C of FIG. 1C.
Figure 5:
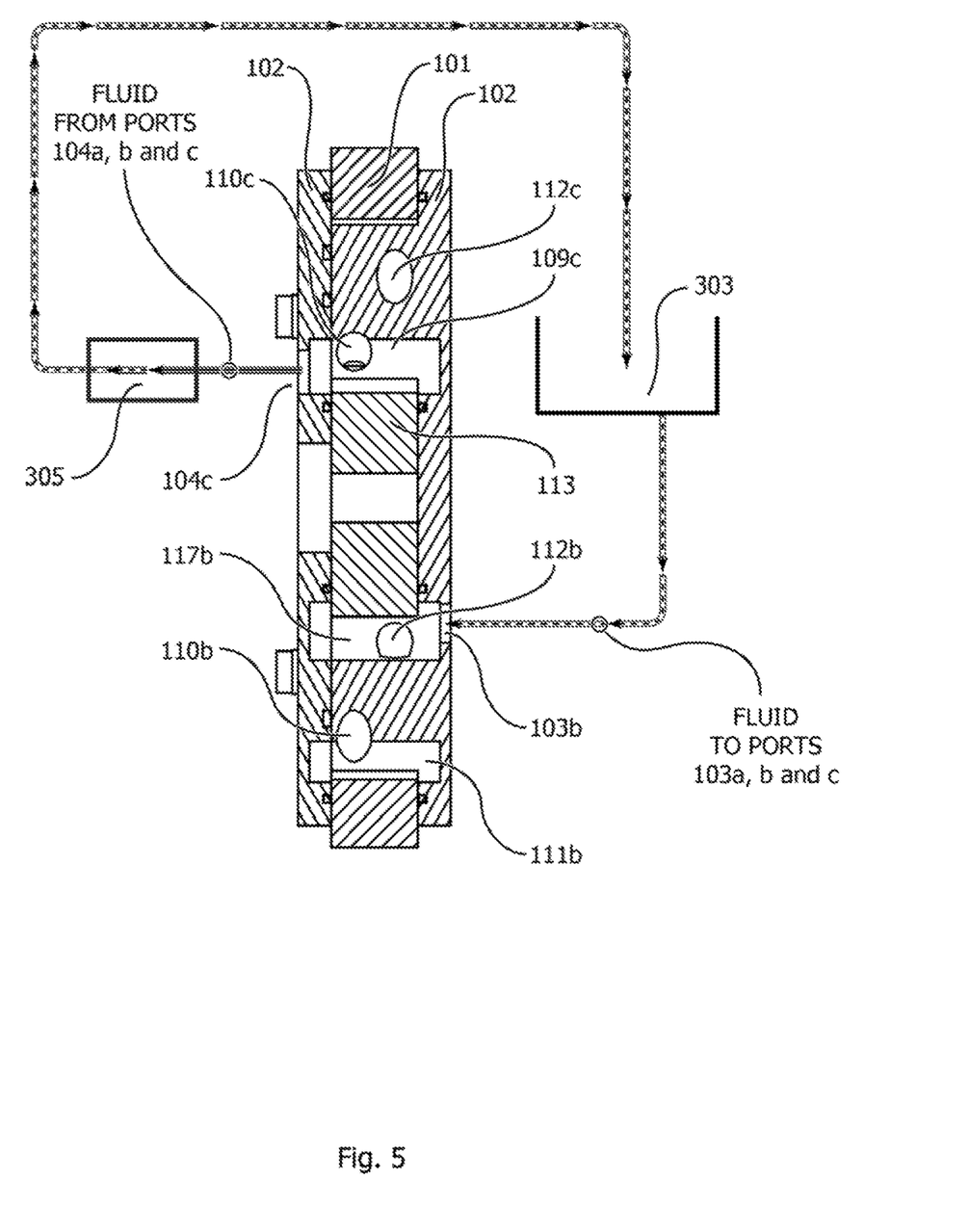
FIG. 5 is a cross-sectional view similar to FIG. 4 but also schematically showing an external hydraulic system for speed ratio control.

FIG. 4 shows that the high-pressure transfer passage 110b, and the low-pressure transfer passage 112b of the pump section 102b, and transfer passages 110c, 112c of the pump section 102c are spaced apart axially (or on different levels) so as not to interconnect. A representative hydraulic control system for effecting speed ratio control is shown schematically in FIG. 5. Fluid enters through the ports 103a-103c from a source such as a reservoir 303. A regulating device 305 acting on the fluid exiting through the ports 104a-104c alters fluid pressures in each pump section and therefore the sun gear 113-to-ring gear 101 speed ratio.

Figures 6A, 6B:
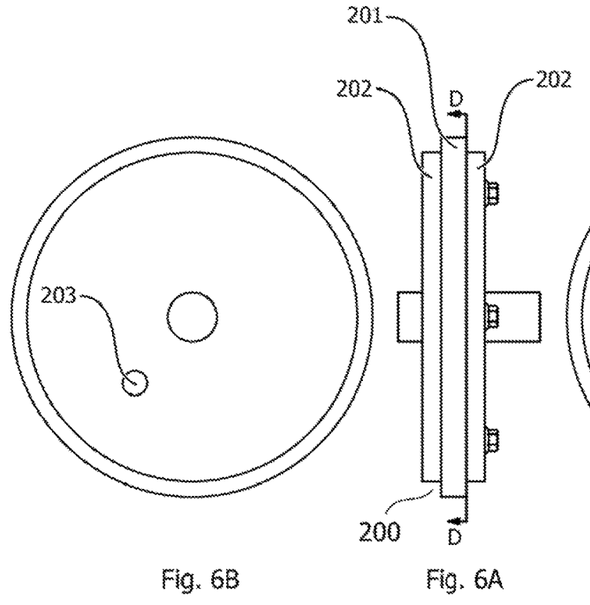
FIG. 6A-6C are, respectively, side, front face and rear face elevational views of a hypocycloid gear set for implementing the present invention.
Figure 6C:
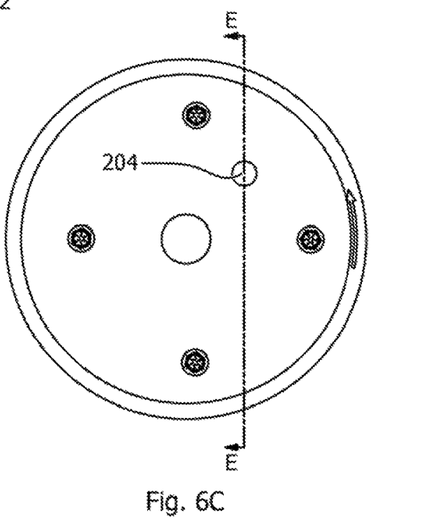

Referring now to FIG. 6A-6C, a hypocyclic gear set embodiment of the present invention designated generally by numeral 200 is shown. A ring gear 201 and a carrier 202 which operate at different speeds rotate about the same axis and have a conventional sealing device for sealing fluid therebetween. Fluid enters the hypocyclic gear set 200 through a port 203 and exits through a port 204.

Figure 7:
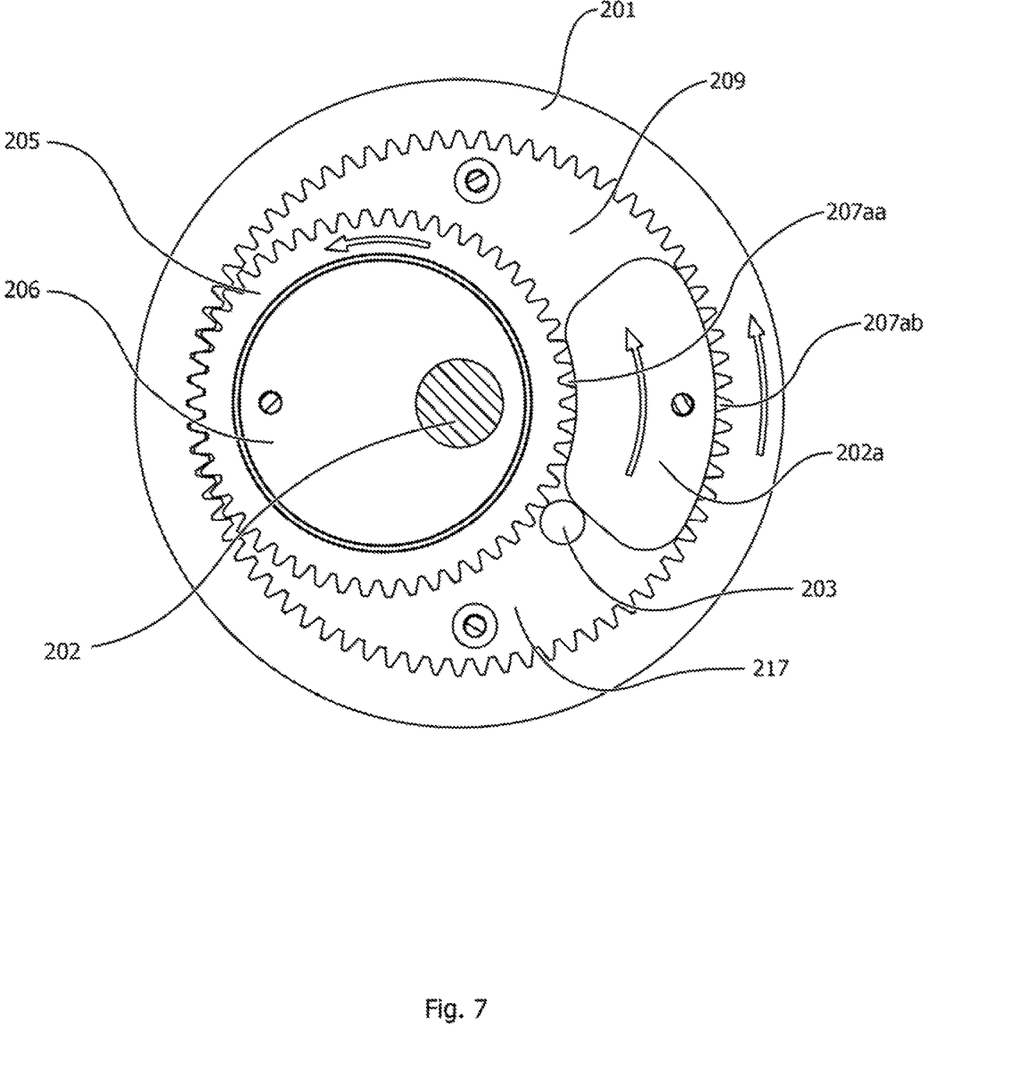
FIG. 7 is a cross-sectional view taken along line D-D of FIG. 6A.

FIG. 7 shows the positive displacement pump in the ring gear 201. Assume, again by way of example, the ring gear 201 to be the input and the carrier 202 to be the output. The ring gear 201 engages with the carrier gear 205 which rotates on a carrier pin 206 that is attached to the carrier 202 and has the same rotational axis as the ring gear 201. When the ring gear 201 is rotated counterclockwise, the carrier gear 205 as well as the carrier 202 rotate counterclockwise. The carrier 202 has a pump body 202a located between the carrier gear 205, the ring gear 201, and the end plates of the carrier 202 to concurrently capture fluid in gear teeth cavities at two locations 207aa, 207ab to create one positive displacement fluid pump section.

Figure 8:
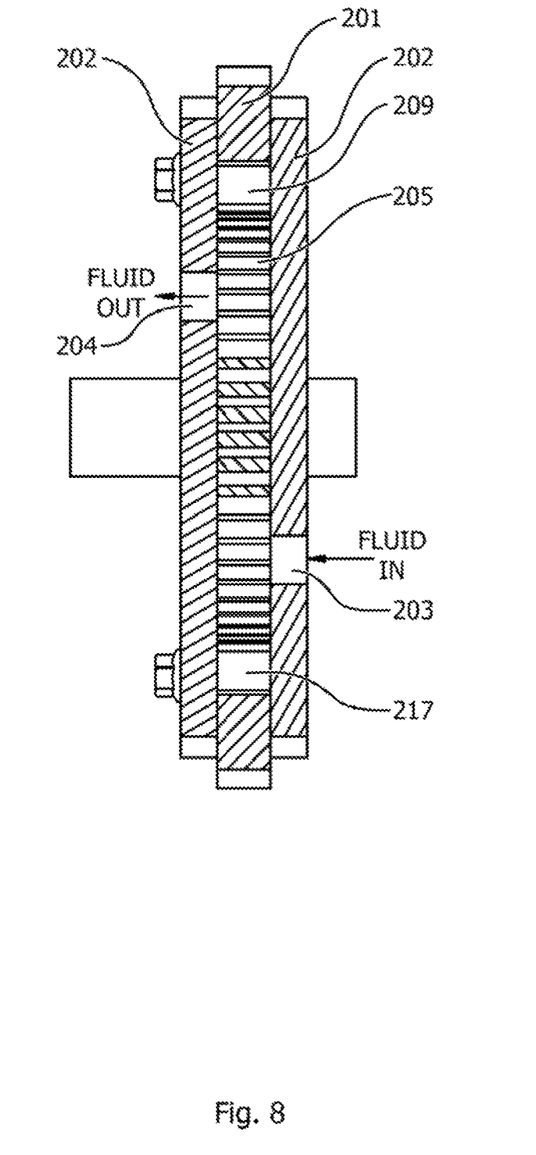
FIG. 8 is a cross-sectional view taken along line E-E of FIG. 6C.

Fluid entering through the port 203 fills a plenum 217 and supplies gear teeth cavities 207aa, 207ab. Due to the relative motion of the rotating gears, the fluid becomes captured in the cavities 207aa, 207ab and is transported by gear rotation. The cavities 207aa, 207ab discharge the fluid to a plenum 209, and the fluid then exits through the port 204 shown in FIGS. 6C and 8. A simple hydraulic control system similar to the epicyclic variant shown schematically in FIG. 5 can also be applied to the hypocyclic gear set embodiment for controlling fluid pressure.

Figure 9:
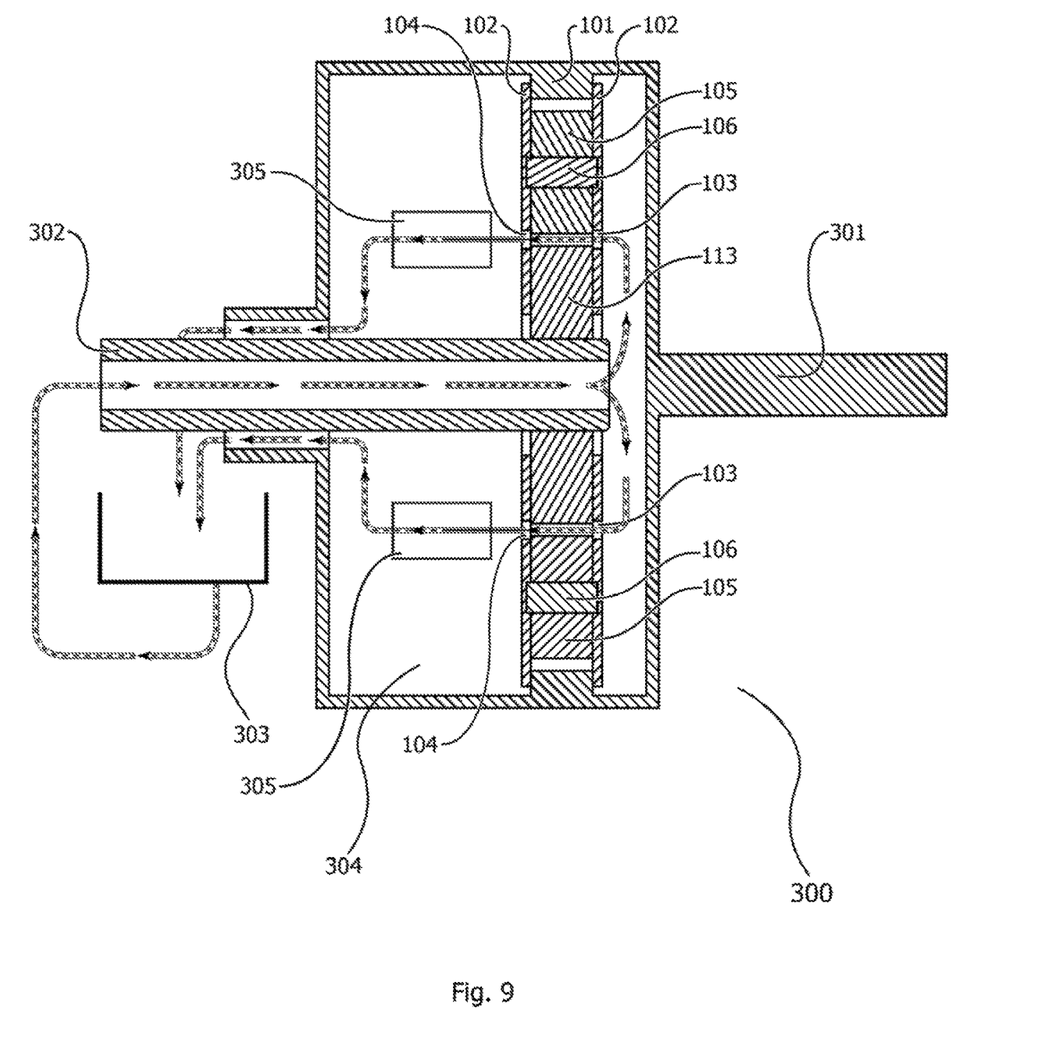
FIG. 9 is a cross-sectional view of one embodiment of the present invention utilized in a transmission system.

Now referring to FIG. 9, a transmission system or the like designated by the numeral 300 has a rotating input shaft 301 that is an extension of ring gear 101 shown in FIG. 1A-1C and FIG. 2 which transfers torque to the sun gear 113 that is directly attached to the output shaft 302. Both the input and output shafts 301, 302 rotate in the same direction. Now output shaft speed can be varied from zero rpm up to the input shaft speed simply by controlling fluid pressure. Pumped fluid starts in a reservoir 303, is pulled through the center of the output shaft 302 to enter the gear set at port 103. Fluid pressure increases within the gear set, and the fluid exits at a higher pressure through the port 104 where it enters a regulator system 305 like that shown in FIG. 5 to control the output shaft-to-input shaft speed ratio, then it discharges into a cavity 304 rotating in unison with the ring gear 101. Fluid exits the rotating cavity 304 coaxially about the input shaft 301 and enters the reservoir 303.

Figure 10:
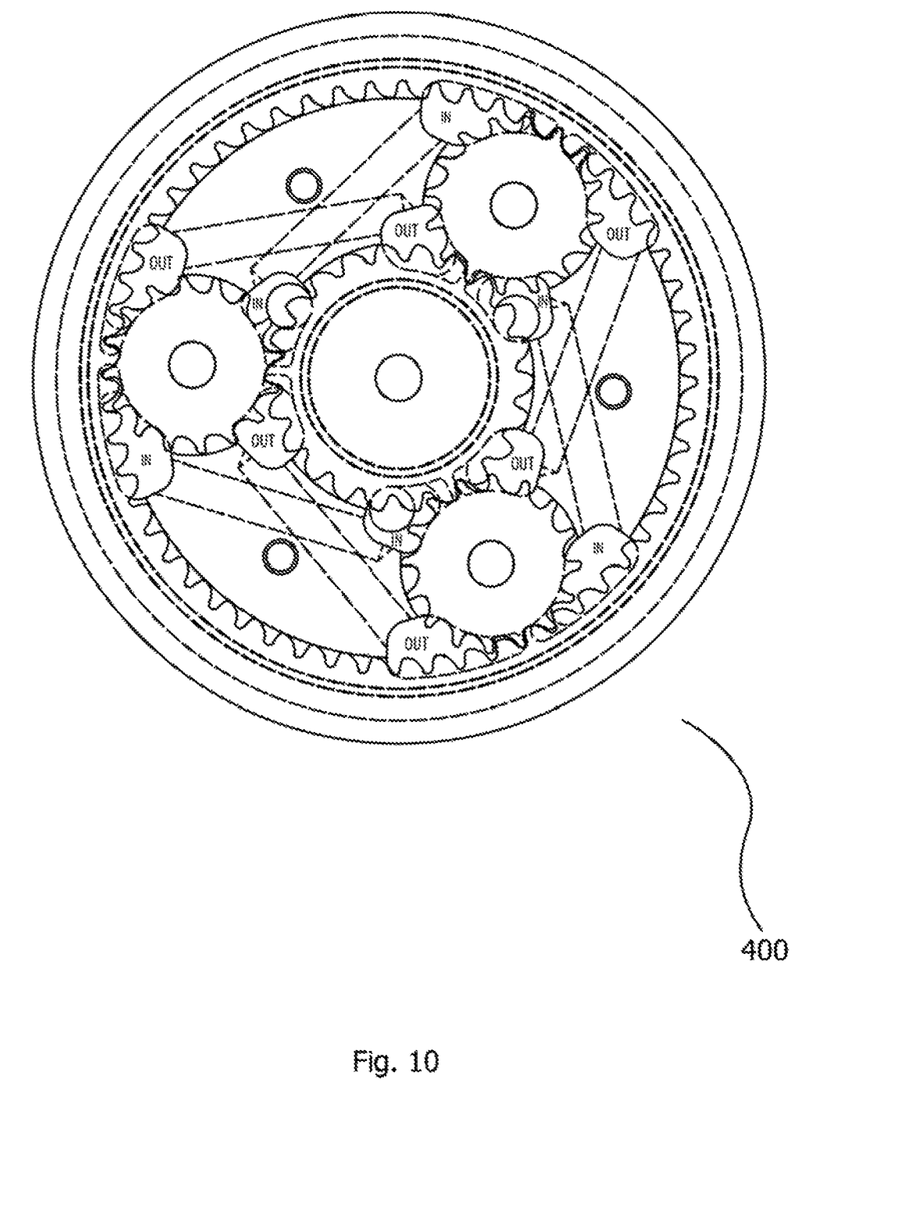
FIG. 10 is a cross-sectional view taken along line A-A of FIG. 1 where gear teeth of the type used in the embodiments of FIG. 1A-FIG. 1C and FIG. 6A-FIG. 6C are replaced with an alternative shape.

The principles of the present invention are, however, not limited to epicyclic or hypocyclic gear sets and be applied to any similar operating devices. It is also not limited to gears only, but may be used with any meshing shape that creates a mechanical load path between the input and output rotating devices where voids in the rotating mechanisms of the mechanical load path are captured so as to create a positive displacement fluid pump. One example of an alternate embodiment designated generally by numeral 400 employing a meshing configuration different from that of the gears shown in the epicyclic arrangement of FIG. 2 and FIG. 3 but otherwise employing the same pump section construction is depicted in FIG. 10.

Figure 11A:
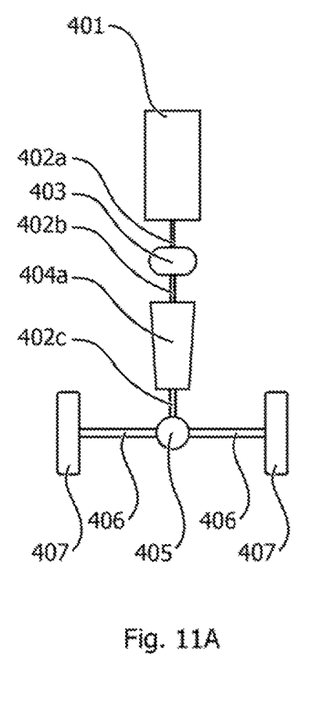
FIG. 11A-FIG. 11C are schematic plan views of three embodiments of the present invention used in power vehicles.
Figure 11B:
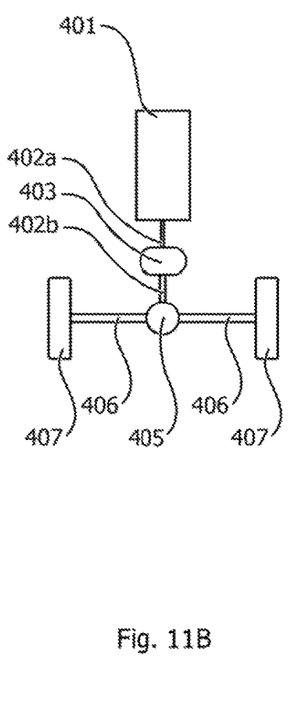
Figure 11C:
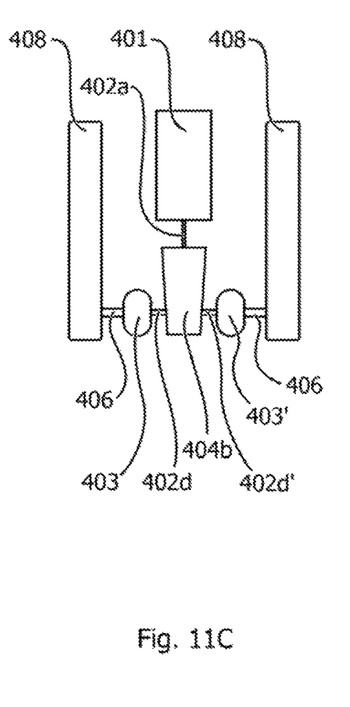

FIG. 11A-11C are illustrative examples of how the present invention can be employed in, for example, vehicle powertrains with the understanding that other uses will be apparent to one skilled in the art given the benefit of the present invention. In all three examples, similar parts are designated by the same numerals. An engine 401 rotates an output shaft 402a that requires torque multiplication and speed control extending beyond the engine's range. Now referring to FIG. 11A, a shaft 402a is the input to a regulating device 403 of the present invention of the types described above in connections with FIG. 1A through FIG. 10, where the device's output shaft 402b is the input to a multi-range gearbox 404a (here "gearbox" is intended to include any type of manual and automatic transmission) with an output shaft 402c transferring power to a differentiating gearbox 405 that distributes power to drive axles 406 and tires 407. In the embodiment of FIG. 11B, a shaft 402a is the input to the regulating device 403 whose output shaft 402b directly transfers power to a differentiating gearbox 405 that distributes power to drive axles 406 and tires 407. In the embodiment shown in FIG. 11C, a vehicle rides on a continuous track or a series of wheels on each side of the vehicle 408. A splitter-type gearbox 404b and two regulating devices 403 together comprise a steering transmission. A shaft 402a transfers power to the splitter type gearbox 404b that has two output shafts 402d, 402d' that each transfer power to the respective device 403, 403'. Each device 403, 403' can be controlled independently to vary the speed to drive shafts 406 and continuous tracks or a series of wheels 408 for controlling vehicle direction.

EXAMPLE

Figure 14:
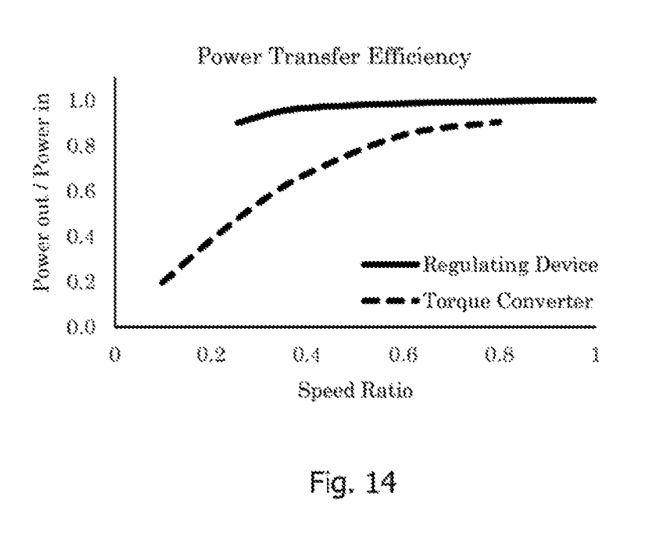
FIG. 14 is a graph comparing output shaft to input shaft power transfer efficiencies of a torque converter and the present invention tabulated in FIG. 13.
Figure 15:
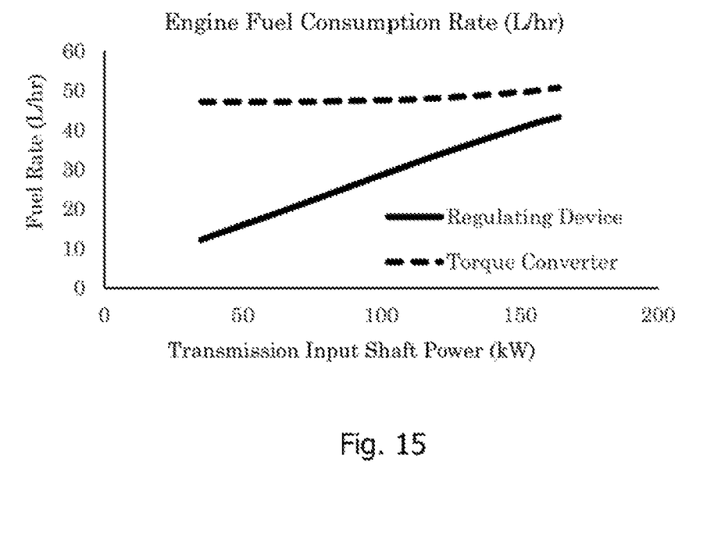
FIG. 15 is a graph comparing the fuel consumption rates tabulated in FIG. 13.

The regulating device of the present invention was used in a diesel engine-powered application as in FIG. 11A to replace the torque converter in an automatic transmission and improve efficiency. FIG. 12 shows the diesel engine power and fuel consumption rates resulting from this application. FIG. 13 demonstrates the dramatic improvement in efficiency of the regulating device of the present invention compared to the torque converter at identical output shaft conditions because the former is more efficient and has the ability to control the speed ratio whereas the torque converter it replaced did not. Thereby, optimization of engine speed and power for similar overall output performance has been achieved with the present invention. Consequently, the engine speed at low speed ratios has been reduced to a region where the engine is more efficient combined with increased power transfer efficiency to provide a significant overall improvement. FIG. 14 graphically compares the efficiencies for my regulating device and a known torque converter and shows an optimized system using the former is significantly more efficient than the latter. FIG. 15 is a graph demonstrating that the engines fuel consumption rate is substantially improved when compared with the conventional torque converter system.

Therefore, I do not intend to be limited to the details shown and described in this application but rather seek to protect all such changes and modifications that are now apparent to those skilled in the art and that are encompassed by the scope of the appended claims.

I claim:

1. A device for transmitting mechanical power that allows variable output-speed to input-speed ratios, comprising: first, second, and third components operatively arranged to rotate about a common axis selectively at the same rotational speed and at different relative rotational speeds, as determined by at least one of fluid flow and fluid pressure, at least one inlet port and fluid passageway for introducing a working fluid into at least one volume space defined between at least one of the first and second components and of the second and third components, at least one outlet port, at least one fluid passageway configured and arranged to collect the working fluid exiting from the at least one volume space and to allow the collected working fluid to exit at the at least one outlet port, and an apparatus configured to control at least one of internal pressure and flow of the working fluid through the device, and where the volume space between the one or more of the first and second components and the one or more of the second and third components is a variable volume when the working fluid is allowed to flow through the device and is a fixed volume when the fluid is prevented from flowing through the device.

2. The device according to claim 1, wherein output speed provided from the device equals input speed to the device when the working fluid is prevented from flowing through the device.

3. The device according to claim 1, wherein, when the working fluid is allowed to flow, an output speed provided by the device is a selected fraction of a device input speed that is controlled by varying the pressure of the working fluid.

4. The device according to claim 1, wherein the first component is configured to function as a ring gear, the second component is configured to function as at least one planet gear, and the third component is configured to function as sun gear.

5. The device according to claim 4, wherein input power is applied to rotate one of the ring gear and the sun gear and output power is provided by rotation of one of the sun gear and ring gear, respectively.

6. The device according to claim 4, wherein the at least one volume space comprises variable volumes created by meshing of a portion of the ring gear with at least one of the planet gears and by meshing of at least one of the planet gears with a portion of the sun gear.

7. The device according to claim 6, wherein interactions of the ring gear with the at least one planet gear and with the at least one planet gear with the sun gear transmit the mechanical power.

8. The device according to claim 6, further comprising a hydraulic control system to control the fluid pressure of the working fluid that exits the variable volumes between the ring gear and the at least one planet gear and between the at least one planet gear and the sun gear controls relative rotational speeds between the ring gear and the sun gear.

9. The device according to claim 8, wherein the at least one input port and at least one fluid passageway are configured to allow the working fluid entering the device to be distributed to an inlet portion of the meshing portions and the at least one outlet port and at least one fluid passageway to allow the working fluid that exits the variable volumes to flow to the at least one outlet port.

10. The device according to claim 1, wherein an engine provides the mechanical power that is used to propel a vehicle.

11. The device according to claim 10, wherein the device is one of a manual and automatic transmission directly to drive axles of the vehicle or indirectly through a differentiating gearbox.

12. The device according to claim 10, wherein the vehicle comprises one of continuous tracks and skid-steer wheel system with wheels on one side of the vehicle moving in unison and wheels on another side of the vehicle moving in unison for vehicle movement, and the device is arranged between each side of a splitter gearbox and the continuous tracks or the skid-steer wheel system.

13. The device according to claim 1, wherein the working fluids control apparatus is configured to provide a substantially infinitely variable output-speed to input-speed ratio.

* * * * *